Figure 1:
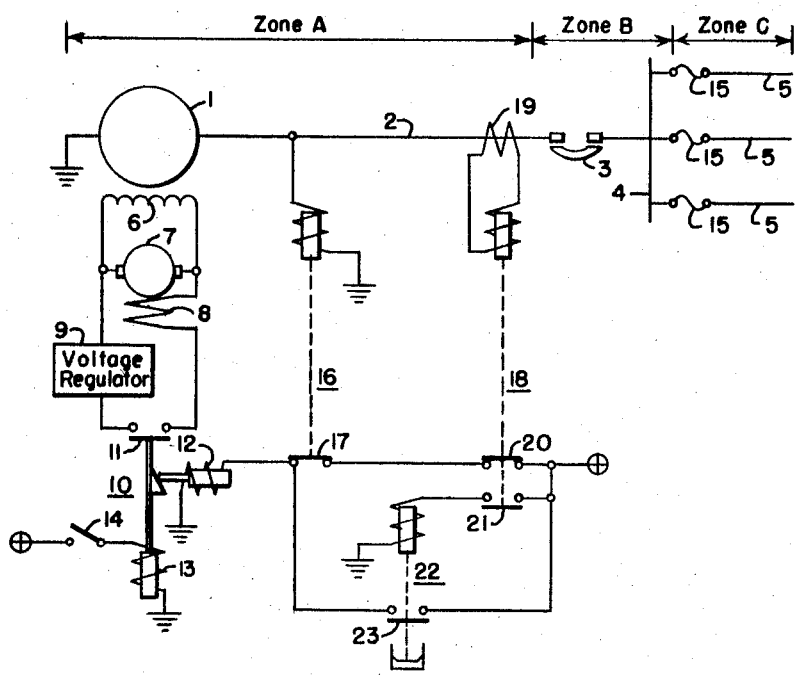

July 29, 1958     L. R. LOWRY, JR     2,845,593
GENERATOR CONTROL AND PROTECTIVE SYSTEM Filed July 12, 1957     2 Sheets-Sheet 1

Fig. I.

WITNESSES:
Bernard R. Gieguez
Leon M. Garman

INVENTOR
Lewis R. Lowry, Jr.
BY
ATTORNEY

United States Patent Office 2,845,593
Patented July 29, 1958

2,845,593

GENERATOR CONTROL AND PROTECTIVE SYSTEM

Lewis R. Lowry, Jr., Lima, Ohio, assignor to Westinghouse Electric Corporation, East Pittsburgh, Pa., a corporation of Pennsylvania Application July 12, 1957, Serial No. 671,610

12 Claims. (Cl. 322—25)

The present invention relates to the control and protection of alternating current generators and, more particularly, to a protective system for protection against faults in the generator or on the feeders and distribution system to which it is connected.

The invention is particularly suitable for use in alternating current electrical systems for aircraft, although it will be obvious that its usefulness is not restricted to any specific application and it may be used in any similar electrical system.

In an electrical system in which an alternating current generator is connected to a load bus and distribution system by means of feeders, it is necessary to provide protection against faults in the generator or on the feeders and also against faults on the load bus itself and on the distribution buses connected to it.

Protection against generator and feeder faults has usually been provided by means of differentially connected current transformers, one set of transformers being connected in the neutral leads of the generator and another set of transformers being connected adjacent the circuit breaker which connects the feeders to the load bus. The secondaries of corresponding transformers are differentially connected together and under normal conditions, when the currents are equal on opposite sides of the generator, the transformer secondary voltages are equal and opposite. In case of a fault in the generator or on the feeders, between the two sets of current transformers, the transformer secondary voltages become unequal, and circulating currents flow which are detected by means of relays which operate to deenergize the generator field and usually also to trip the circuit breaker to disconnect the generator from the bus.

This type of fault protection has been widely used, but it has certain serious disadvantages, especially for aircraft use. The differential transformer system provides protection against generator and feeder faults in the zone between the two sets of transformers, and the distribution buses can be adequately protected by means of fuses, but such an arrangement leaves the load bus itself, between the generator circuit breaker and the fused distribution buses, without any protection. A fault in this zone, however, can be extremely serious and can cause rapid destruction of the generator by the heavy fault current. The differential protective system is also less reliable than is desirable. In an aircraft installation, the feeders usually consist of several heavy conductors for each phase, each conductor being heavily insulated and very carefully installed. The leads of the differential protection system between the current transformers, however, are very small wires lightly insulated and are much more subject to grounding or breakage than the feeder conductors. In the usual aircraft system, therefore, the differential protection system itself is usually less reliable than the circuits it is intended to protect, and false tripping of the breaker is likely to occur as a result of faults on the protective system. Still another disadvantage of the differential protection system is that in a three-phase system, six current transformers are required which are relatively heavy and bulky, which is very undesirable for aircraft use where the size and weight of the system must be kept to a minimum. A better and more reliable system is, therefore, needed.

The principal object of the present invention is to provide a simple and highly reliable protective system for alternating current generators which provides complete protection against faults in the generator and any part of the system to which it is connected and which eliminates the disadvantages of the conventional differential protective system outlined above.

Another object of the invention is to provide a protective system for an alternating current generator system which provides complete protection against generator or feeder faults and also against faults on the load bus between the feeders and the fused distribution buses, and which is more reliable than the conventional protective systems.

A further object of the invention is to provide a protective system for protection against faults in a single generator system of the type in which an auxiliary generator is automatically connected to the load bus when the main generator is disconnected, in which means are provided for positively preventing connection of the auxiliary generator to the bus when a bus fault has occurred, thus preventing any possibility of connecting the auxiliary generator to a faulted bus with resulting probability of damage to the auxiliary generator.

Figure 2:
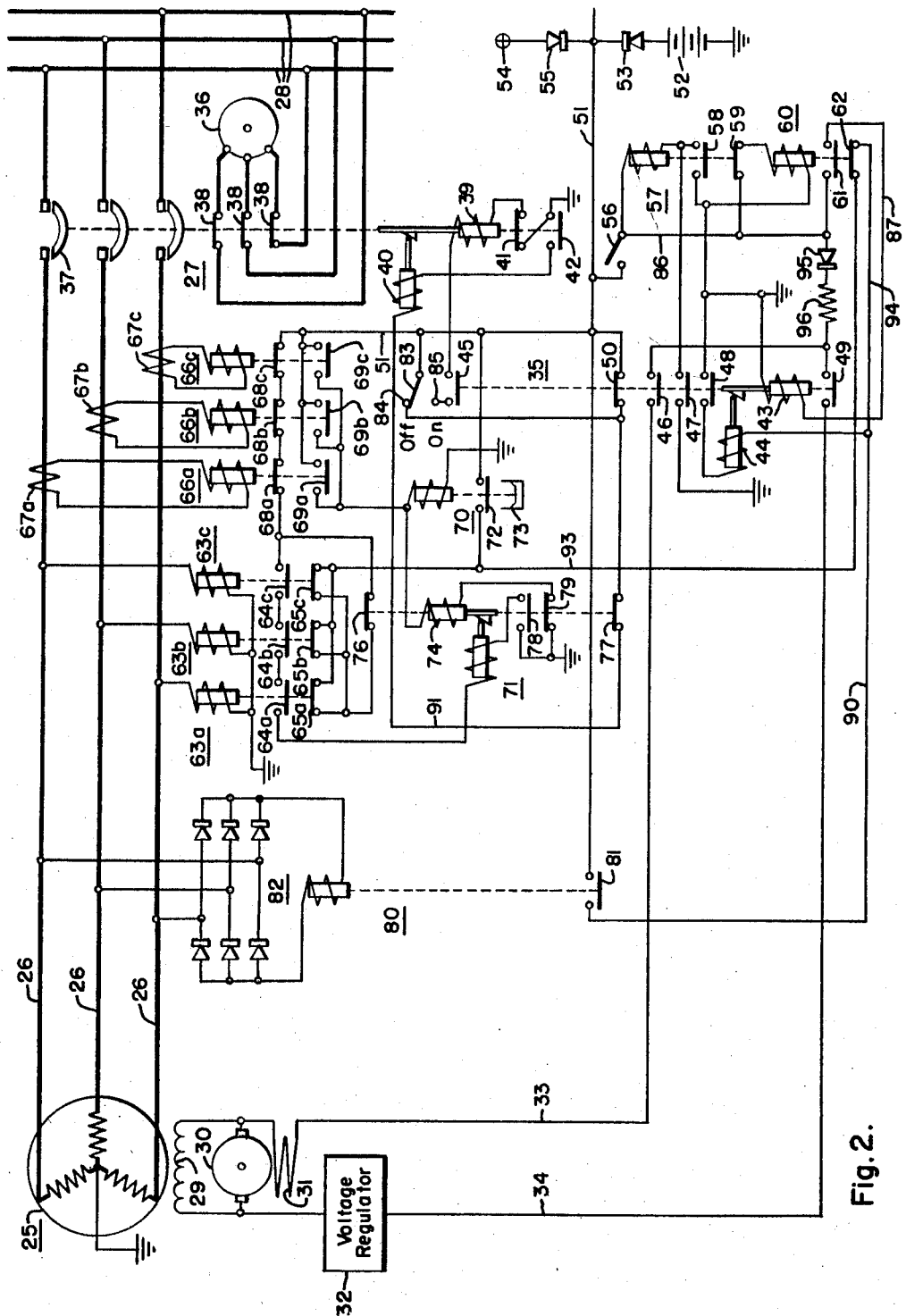

Other objects and advantages of the invention will be apparent from the following detailed description, taken in connection with the accompanying drawings, in which:

Fig. 1 is a simplified single-line diagram illustrating the principles of the invention; and Fig. 2 is a schematic diagram showing a typical embodiment of the invention in a complete protective system.

The basic principles of the invention are illustrated in Fig. 1, which is a single-line diagram showing the application of the invention to a simple system consisting of an alternating current generator 1 connected by a feeder 2 and circuit breaker 3 to a load bus 4. The load bus 4 is connected to the distribution system supplied by the generator by means of a plurality of distribution buses 5.

The generator 1 may be any suitable type of alternating current generator, either three-phase or single-phase, and has a field winding 6 supplied with direct current excitation from an exciter 7, which is shown for the purpose of illustration as being a direct current exciter having a self-excited shunt field winding 8. The field winding 8 is controlled by a voltage regulator 9, of any suitable type, to maintain constant output voltage of the generator 1. The generator field excitation is controlled by a control relay 10 having a contact 11, which is shown connected in series in the exciter field winding circuit, so that when the contact 11 is open, the exciter field winding is deenergized and the exciter output voltage drops to substantially zero to remove field excitation from the generator 1. The control relay 10 may be a latch-type relay having a trip coil 12 and a closing coil 13 which actuates the relay to close its contact 11 when the coil 13 is energized. The closing coil 13 may be controlled either manually or automatically by any suitable means, indicated diagrammatically by a switch 14.

As previously discussed, the conventional means for protection against faults in a system of this kind involves the use of differentially connected current transformers connected in the neutral lead of the generator 1 and in the feeder 2 adjacent the circuit breaker 3. Such an arrangement provides adequate protection for faults occurring between the two sets of transformers, that is, in zone A of Fig. 1. Protection against faults on the distribution system, zone C of Fig. 1, is usually provided by means of fuses 15 in the distribution buses 5. Such a conventional arrangement, however, provides no protection for faults in zone B, between the feeder and the distribution buses, although a fault in this zone can be very serious. There are possible expedients for providing some degree of protection for this zone with the conventional differential protective system; but none of the available expedients is entirely satisfactory for actual use, and the differential transformer system, of course, also has the other disadvantages previously discussed.

In accordance with the present invention, fault protection for the entire generator and distribution system is provided in a simple and highly reliable manner. For this purpose, an undervoltage relay 16 is connected to respond to the generator voltage. The relay 16 has a contact 17 connected to the trip coil 12 of the control relay 10. An overcurrent relay 18 is connected to a current transformer 19 to respond to the current in the feeder 2 adjacent the circuit breaker 3. The overcurrent relay 18 has a normally closed contact 20, connected in series with the contact 17 of the undervoltage relay 16 in an energizing circuit for the trip coil 12, and has a normally open contact 21 connected to control a time delay relay 22. The time delay relay 22 has a normally open contact 23 connected to complete an energizing circuit for the trip coil 12 independently of the contacts 17 and 19, as shown. The time delay relay 22 may be any suitable type of relay which has means for providing a predetermined time delay after energization of the relay 22 before the contact 23 closes.

In the operation of this system, when the control relay 10 is in its closed and latched position and the generator is running, the undervoltage relay 16 is energized by the generator voltage so that its contact 17 is open. If a fault occurs in zone A, that is, in the generator 1 or on the feeder 2, the generator voltage will drop to substantially zero, or drops to a low enough value to cause the undervoltage relay 16 to drop out and close its contact 17. The overcurrent relay 18 is not energized since a fault in this zone does not cause heavy fault currents beyond the fault. Closing of the undervoltage relay contact 17 therefore completes the energizing circuit for the trip coil 12, and the control relay 10 is immediately tripped to remove field excitation from the generator 1. The relay 10 may also be arranged, if desired, to effect tripping of the circuit breaker 3 in a known manner.

If a fault occurs in zone B or zone C during normal operation, a heavy fault current will flow from the generator to the fault, and the overcurrent relay 18 is energized and opens its contact 20. The voltage of the generator 1 may drop sufficiently for the undervoltage relay 16 to drop out, but this has no effect because the open contact 20 of the overcurrent relay 18 interrupts the energizing circuit for the trip coil 12. The undervoltage relay 16 may have a short time delay, if desired, to insure that the overcurrent relay contact will open before the undervoltage relay contact closes. The overcurrent relay 18 also closes its contact 21 which energizes the time delay relay 22 and causes it to close its contact 23 after a predetermined time delay. If the fault is in the distribution system, in zone C, the fault will be cleared by blowing of one or more of the fuses 15 before the time delay relay 22 has had time to close its contact. If the fault is cleared in this way, the overcurrent relay 18 will drop out and deenergize the time delay relay 21, so that the system returns to its normal condition without any interruption of power to the good distribution buses. If the fault is in zone B, however, fault current will continue to flow, and after the predetermined time delay, the relay 22 closes its contact and completes an energizing circuit for the trip coil 12. Thus, protection is provided in a simple and reliable manner for faults occurring in any part of the system, and the disadvantages of the conventional differential protection system are completely eliminated.

Fig. 2 shows a complete control and protective system for a single generator embodying the principles described in connection with Fig. 1. The generator 25 of Fig. 2 is shown as a three-phase generator connected by means of feeders 26 and a circuit breaker 27 to a three-phase load bus 28. It will be understood that distribution buses are connected to the load bus 28, to supply the individual loads or other parts of the distribution system, and are provided with fuses as shown in Fig. 1.

The generator 25 has a field winding 29 which may be supplied with direct current excitation from any suitable excitation system, shown for the purpose of illustration as comprising a direct current exciter 30 having a self-excited shunt field winding 31. A voltage regulator 32 of any suitable type is preferably provided to control the exciter field current, and thus the excitation of the generator 25, to maintain the generator output voltage at a desired value. The excitation circuit is completed through conductors 33 and 34 by means of a control relay 35, as described hereinafter. It will be understood that any suitable type of excitation system may be utilized, and the exciter 30 and regulator 32 are to be taken as representing any such system.

In the generator system shown, an auxiliary generator 36 is provided and is automatically connected to the load bus 28 when the main generator 25 is disconnected. The generator 36 may be any suitable type of auxiliary or stand-by alternating current generator capable of supplying at least a part of the load when the main generator 25 is disconnected. The circuit breaker 27 is shown as a latch-type transfer breaker having main contacts 37 for connecting the generator 25 to the load bus and having auxiliary or transfer contacts 38 which close when the main contacts open to connect the auxiliary generator 36 to the bus, as shown. The circuit breaker 27 has a closing coil 39 for effecting closure of the main contacts and has a trip coil 40 for releasing the latching means to effect opening of the main contacts 37 and closure of the transfer contacts 38. One end of each of these coils is connected to ground, as shown, through conventional auxiliary contacts 41 and 42, respectively, on the circuit breaker.

The control relay 35 is shown as a latch-type relay having a closing coil 43 and a trip coil 44. The relay 35 is utilized to control the excitation circuit of the generator 25, as mentioned above, and also to control the circuit breaker 27 and for certain other purposes as described later. For this purpose, the relay 35 is provided with normally open contacts 45, 46, 47, 48 and 49, and a normally closed contact 50. The contacts 46 and 49 of the control relay 35 are connected in series to complete the exciter field winding circuit through the conductors 33 and 34, so that these contacts control the generator excitation circuit. The contact 45 is connected to the closing coil 39 of the circuit breaker 27, and the contact 50 is connected to control the trip coil 40 as hereinafter described.

Direct current control power for operation of the various relays of the system is provided by means of a direct current supply conductor 51 which may be supplied with direct current from any suitable source, shown diagrammatically as a battery 52 having its negative terminal connected to ground and its positive terminal connected to the conductor 51 through a blocking rectifier 53. The battery 52 is to be taken as representing any suitable source of direct current, such as the direct current bus which is normally available on most aircraft, for example. Preferably, a second source of direct current, indicated diagrammatically at 54, is provided for increased reliability and is connected to the conductor 51 through a blocking rectifier 55. The second direct current source 54 may be obtained in any desired manner, as by means of a small permanent magnet generator built integrally with the main generator 25, or may be any other desired source.

Operation of the control relay 35 is controlled by a manual switch 56, preferably of the momentary contact type, and by a lockout relay 57 having a normally open contact 58 and a normally closed contact 59, and an undervoltage lockout relay 60 having a normally open contact 61 and a normally closed contact 62.

Fault protection is provided in the manner described above in connection with Fig. 1 by means of undervoltage relays 63a, 63b, and 63c. Each of these relays has its operating coil connected between one phase of the generator and ground, as shown, so that the relays respond to the phase voltages of the generator. The undervoltage relays have normally open contacts 64a, 64b, and 64c, which are connected to each other in series, and have normally closed contacts 65a, 65b, and 65c, which are connected in parallel to control an energizing circuit for the trip coil 44 of the control relay 35.

Three overcurrent relays 66a, 66b, and 66c are also provided and are connected to respond to the currents in the feeders by means of current transformers 67a, 67b and 67c, respectively. The overcurrent relays have normally closed contacts 68a, 68b, and 68c, which are connected in series with each other, and have normally open contacts 69a, 69b, and 69c which are connected in parallel with each other.

The parallel-connected overcurrent relay contacts 69a, 69b, and 69c control a time delay relay 70 and a breaker lockout relay 71. The time delay relay 70 may be of any suitable type of relay having a normally open contact 72 and provided with any suitable type of time delay means, indicated at 73, to obtain a predetermined time delay in the operation of the relay. The contact 72 is connected to effect tripping of the control relay 35 as hereinafter described. The breaker lockout relay 71 is a latch-type relay having an operating coil 74 and a trip coil 75. The relay 71 has contacts 76 and 77 which are closed when the breaker is in the tripped position shown. When the coil 74 is energized, the relay 71 is actuated to a position in which the contacts 76 and 77 are open and remains latched in that position until the trip coil 75 is energized. The relay 71 is also provided with auxiliary contacts 78 and 79 which are connected to the coils 74 and 75, respectively, as shown.

An overvoltage relay 80 is also provided for protection against overvoltage. The overvoltage relay 80 is shown as having a normally open contact 81 and is energized in response to the average of the three phase voltages of the generator 25 by means of a rectifier bridge 82.

A manual switch 83 is provided for control of the circuit breaker 27. The manual switch 83 is connected to the direct current supply conductor 51. The switch 83 has an "off" contact 84, connected to the circuit breaker trip coil 40 through the breaker lockout relay contact 77, and has an "on" contact 85 connected to the closing coil 39 of the breaker through the control relay contact 45.

The system is shown in the drawing in its deenergized condition, with all relays deenergized and the circuit breaker 27 open so that the auxiliary generator 36 is connected to the bus 28. If it is now desired to bring the generator 25 up to voltage and connect it to the bus 28, assuming that the generator 25 is being driven at normal speed by its prime mover, the control relay 35 is first actuated to closed position. This is done by closing the manual starting switch 56. This completes a circuit from the direct current conductor 51 through the switch 56, conductor 86, lockout relay contact 59 and undervoltage lockout relay coil 60 to ground, so that the relay 60 is energized and closes its contact 61 and opens its contact 62. The contact 62 is connected, as hereinafter described, in the energizing circuit for the trip coil 44 of the control relay 35 so that energization of the trip coil is prevented when the relay 60 operates. When the undervoltage lockout relay contact 61 closes, a circuit is completed from the direct current conductor 51 through switch 56, conductor 86, relay contact 61 and conductor 87 to the closing coil 43 of the control relay 35, so that the control relay is actuated to its closed position and latches in that position.

When the control relay closes its contacts 46 and 49, the excitation circuit for the generator 25 is completed so that the generator field is excited and the generator can build up its voltage. The exciter field is preferably flashed from the direct current supply through a rectifier 95 to insure build up and correct polarity of the exciter voltage. A resistor 96 is provided to limit the current and prevent possible overvoltage.

Upon closing of the control relay, the contact 47 closes and completes a circuit from the direct current conductor 51 through switch 56, lockout relay 57 and control relay contact 47 to ground. The lockout relay 57 is thus energized and opens its contact 59 so that the undervoltage lockout relay 60 is deenergized and recloses its contact 62. At the same time, the lockout relay 57 closes its contact 58, which completes a sealing circuit for the lockout relay 57 so that it remains energized as long as the switch 56 is held closed. In this way, the system is made electrically trip-free, since the energizing circuit for the control relay closing coil 43 cannot be completed as long as the lockout relay 57 is energized and prevents energization of the undervoltage lockout relay 60. Thus, if a fault occurs while switch 56 is closed, or if the switch is closed during the existence of a fault, the relay 35 is immediately tripped but will not cycle since after it is tripped it cannot reclose unless the switch 56 is first allowed to open to drop out the lockout relay 57 and is then reclosed.

The undervoltage lockout relay 60 prevents immediate tripping of the control relay 35 before the generator voltage can build up. It will be understood that when the control relay 35 is closed, the generator voltage is initially substantially zero, and the undervoltage relays 63 are deenergized so that their contacts 65 are closed. As described hereinafter, these contacts complete an energizing circuit for the control relay trip coil 44, and the relay 35 would be immediately tripped before the generator could build up its voltage. The undervoltage lockout relay 60, however, interrupts the trip coil energizing circuit long enough to permit the generator voltage to build up sufficiently to energize the undervoltage relays 63 so that their contacts 65 open before the undervoltage lockout relay 60 drops out, unless a fault is present or the generator voltage fails to build up for any reason. The undervoltage lockout relay 60 may be designed to have a short time delay on dropout to give the generator voltage time to build up and energize the undervoltage relays.

When the control relay 35 closes, it also closes its contact 45 simultaneously with the contacts mentioned above. The generator 25 can then be connected to the bus at any time by placing the control switch 83 on the "on" contact 85. This completes a circuit from the direct current conductor 51 through the switch 83, contact 85, control relay contact 45, breaker closing coil 39 and auxiliary contact 41 to ground, so that the breaker 27 closes to connect the generator to the bus. The system is then in its normal operating condition.

If an overvoltage condition occurs during operation, the overvoltage relay 80 is energized and closes its contact 81 when the generator voltage exceeds a predetermined value, the relay 80 preferably having inverse time-voltage characteristics to prevent operation on transients. When the contact 81 closes, a circuit is completed from the direct current supply conductor 51 through the relay contact 81 and conductor 90 directly to the trip coil 44 and closed control relay contact 48, so that the control relay 35 is tripped and interrupts the generator excitation circuit to remove excitation from the generator. When the control relay 35 is tripped, it also completes a circuit from the direct current conductor 51 through relay contact 50, closed contact 77 of the breaker lockout relay 71 and conductor 91 to the trip coil 40 of the breaker 27. Thus, the breaker 27 is tripped in response to tripping of the control relay 35, if the breaker lockout relay contact 77 is closed.

The breaker 27 may also be tripped at any time, if the relay contact 77 is closed, by placing the manual switch 83 on the "off" contact 84 which completes a circuit from the direct current conductor 51 to the conductor 91 through the relay contact 77.

If a fault occurs in the generator 25 or on one or more of the feeders 26 during operation, the generator voltage collapses to substantially zero, or at least to a low enough value to cause the undervoltage relays to drop out. If the fault is on the generator side of the current transformers 67, no fault current flows through the transformers, and the overcurrent relays 66 are not energized. The drop in voltage on one or more of the feeders, however, causes the corresponding undervoltage relay or relays 63 to drop out to the deenergized position shown in the drawing. Thus, in case of a fault in the generator or feeders, one or more of the relay contacts 65a, 65b, and 65c closes. This completes a circuit from the direct current conductor 51 through the series-connected overcurrent relay contacts 68, conductor 92, breaker lockout relay contact 76, one or more of the undervoltage relay contacts 65, conductor 93, undervoltage lockout relay contact 62 and conductor 94 to the trip coil 44 of the control relay 35. Thus, when an undervoltage occurs unaccompanied by overcurrent, the control relay 35 is tripped by the undervoltage relays to remove excitation from the generator, and the breaker 27 is tripped by the relay contact 50 in the manner described above.

If a fault should occur beyond the current transformers 67, in the circuit breaker 27 or load bus 28 or on the distribution buses connected to the bus 28, a heavy fault current will flow through one or more of the current transformers. This causes the corresponding overcurrent relay to be energized so that one or more of the relay contacts 68a, 68b, and 68c open, and the corresponding contacts 69a, 69b, and 69c close. Opening of one or more of the contacts 68 of the overcurrent relays interrupts the circuit through the contacts 65 of the undervoltage relays, so that even if the generator voltage drops sufficiently to cause one or more of the undervoltage relays to drop out, it has no effect. Closing of one or more of the paralleled overcurrent relay contacts 69 completes a circuit from the direct current conductor 51 to the time delay relay 70 and also to the operating coil 74 of the breaker lockout relay 71. The time delay relay 70 is thus energized and closes its contact 72 after a predetermined time delay. If the fault is cleared, as by the blowing of a fuse on a distribution bus, before the relay 70 has closed its contact, the fault current subsides to normal and the corresponding overcurrent relay drops out, deenergizing the relay 70 before its contact can close. If the fault is not cleared, however, the relay contact 72 closes and completes a circuit from the direct current conductor 51 to conductor 93 to trip the control relay 35 as previously described.

The operating coil 74 of the breaker lockout relay 71 is energized at the same time as the time delay relay 70 and actuates the relay 71 to its latched position in which the contacts 76 and 77 are open. Closing of the control relay contact 50, therefore, when the control relay trips, does not trip the circuit breaker 27 since the circuit of the breaker trip coil 40 is interrupted by the open lockout relay contact 77. This prevents operation of the circuit breaker 27 either by tripping of the control relay 35 or by operation of the manual switch 83. In this way, operation of the breaker 27 is positively prevented when a fault occurs on the load bus 28 or in the distribution system, that is, in zones B or C of Fig. 1. It is, therefore, impossible to connect the auxiliary generator 36 to a heavily faulted bus, which could easily result in serious damage to the generator 36.

If the fault is cleared, as by a fuse operation, before the time delay relay 70 closes its contact 72, the current in the feeders returns to normal, and the generator voltage, if it had dropped, also returns to normal, so that the undervoltage relays are energized and the overcurrent relays are deenergized, which deenergizes the time delay relay 70. The control relay 35 is not tripped and there is no interruption of power to the parts of the system not affected by the fault.

If the fault is not cleared before the time delay relay 70 closes, the control relay 35 is tripped and the generator voltage drops to substantially zero so that the undervoltage relays remain deenergized. The control relay 35 may be reclosed by means of the manual starting switch 56, in the manner previously described, and the generator voltage will then again build up if the fault has been cleared.

Thus, in either case, after the fault is cleared and the generator is restored to normal operation, the undervoltage relays are energized and close their contacts 64a, 64b, and 64c while the overcurrent relays are deenergized and their contacts 68a, 68b, and 68c are closed. A circuit is thus completed from the conductor 51 through the overcurrent relay contacts 68 and undervoltage relay contacts 64, all in series, to the trip coil 75 of the breaker lockout relay 71. The breaker lockout relay 71 is, therefore, tripped and recloses its contacts 76 and 77 so that the system is restored to its normal condition.

On a normal shutdown of the generator, by shutting down its prime mover, the manual switch 83 may be in either position. As the generator slows down, its voltage drops and the undervoltage relays drop out, closing their contacts 65, so that the control relay 35 is tripped in the manner previously described and effects tripping of the circuit breaker 27 to disconnect the main generator 25 from the bus and connect the auxiliary generator 36 to the bus 28. The circuit breaker 27 can, of course, be tripped at any time during operation by means of the manual switch 83 as described above, if the breaker lockout relay contact 77 is closed.

It will be seen that the operation of this system is, in general, the same as that previously described in connection with Fig. 1. That is, in case of a fault in zone A, on the generator side of the current transformers, the undervoltage relays cause immediate tripping of the control relay and circuit breaker. In case of a fault in zones B or C, tripping of the control relay by the undervoltage relays is prevented by the overcurrent relays, and the control relay is tripped by the time delay relay if the fault is not cleared before the time delay relay closes. The system of Fig. 2 also includes the additional feature of locking out the energizing circuit of the breaker trip coil in case of a fault in zones B or C, thus making it impossible to connect the auxiliary generator to a faulted bus. The breaker lockout relay 71 is automatically tripped to allow normal operation of the breaker after the fault has been cleared and normal voltage and current conditions have been restored.

It will be apparent, therefore, that a protective system has been provided which provides complete protection against faults in the generator, the feeders, or any part of the distribution system, and thus provides more complete protection than was possible with the conventional systems heretofore used, and in a simpler and more reliable manner since the differential current transformers with their long, vulnerable leads have been eliminated.

Certain specific embodiments of the invention have been shown and described for the purpose of illustration, but it will be understood that various modifications and other embodiments of the invention are possible, and all such modifications are within the scope of the invention.

I claim as my invention:

1. A control and protective system for an alternating current generator having a field winding and excitation means for supplying excitation to the field winding, said system comprising a control relay for controlling the excitation of the generator field winding, switch means for connecting the generator to a load bus, voltage responsive means for actuating said control relay to effect deenergization of the generator field winding when the generator voltage falls below a predetermined value, current responsive means for preventing actuation of the control relay by the voltage responsive means when the generator current exceeds a predetermined value, and means controlled by said current responsive means for effecting actuation of the control relay if the current remains above said value for a predetermined time.

2. A control and protective system for an alternating current generator having a field winding and excitation means for supplying excitation to the field winding, said system comprising a control relay for controlling the excitation of the generator field winding, switch means for connecting the generator to a load bus, voltage responsive means for actuating said control relay to effect deenergization of the generator field winding when the generator voltage falls below a predetermined value, current responsive means for preventing actuation of the control relay by the voltage responsive means when the generator current exceeds a predetermined value, and time delay relay means controlled by said current responsive means for effecting actuation of the control relay independently of the voltage responsive means.

3. A control and protective system for an alternating current generator having a field winding and excitation means for supplying excitation to the field winding, said system comprising a control relay for controlling the excitation of the generator field winding, switch means for connecting the generator to a load bus, voltage responsive relay means connected to complete an energizing circuit for said control relay when the generator voltage falls below a predetermined value to actuate the control relay to effect deenergization of the generator field winding, current responsive relay means connected to prevent completion of said energizing circuit when the generator current exceeds a predetermined value, and time delay means controlled by said current responsive relay means for effecting actuation of the control relay independently of said energizing circuit.

4. A control and protective system for an alternating current generator having a field winding and excitation means for supplying excitation to the field winding, said system comprising a control relay for controlling the excitation of the generator field winding, switch means for connecting the generator to a load bus, voltage responsive relay means connected to complete an energizing circuit for said control relay when the generator voltage falls below a predetermined value to actuate the control relay to effect deenergization of the generator field winding, current responsive relay means connected to prevent completion of said energizing circuit when the generator current exceeds a predetermined value, and a time delay controlled by said current responsive relay means to complete an independent energizing circuit to actuate the control relay.

5. A control and protective system for an alternating current generator having a field winding and excitation means for supplying excitation to the field winding, said system comprising a control relay for controlling the excitation of the generator filed winding, switch means for connecting the generator to a load bus, voltage responsive means for actuating said control relay to effect deenergization of the generator field winding when the generator voltage falls below a predetermined value, the control relay also being connected to effect operation of said switch means to open position upon actuation of the control relay, current responsive means for preventing actuation of the control relay by the voltage responsive means when the generator current exceeds a predetermined value, and means controlled by said current responsive means for effecting actuation of the control relay if the current remains above said value for a predetermined time.

6. A control and protective system for an alternating current generator having a field winding and excitation means for supplying excitation to the field winding, said system comprising a control relay for controlling the excitation of the generator field winding, switch means for connecting the generator to a load bus, voltage responsive relay means connected to complete an energizing circuit for said control relay when the generator voltage falls below a predetermined value to actuate the control relay to effect deenergization of the generator field winding, the control relay also being connected to effect operation of said switch means to open position upon actuation of the control relay, current responsive relay means connected to prevent completion of said energizing circuit when the generator current exceeds a predetermined value, and time delay means controlled by said current responsive relay means for effecting actuation of the control relay independently of said energizing circuit.

7. A control and protective system for an alternating current generator having a field winding and excitation means for supplying excitation to the field winding, said system comprising a control relay for controlling the excitation of the generator field winding, switch means for connecting the generator to a load bus, voltage responsive means for actuating said control relay to effect deenergization of the generator field winding when the generator voltage falls below a predetermined value, the control relay also being connected to effect operation of said switch means to open position upon actuation of the control relay, current responsive means for preventing actuation of the control relay by the voltage responsive means when the generator current exceeds a predetermined value, and means controlled by said current responsive means for effecting actuation of the control relay if the current remains above said value for a predetermined time and for preventing said operation of the switch means.

8. A control and protective system for an alternating current generator having a field winding and excitation means for supplying excitation to the field winding, said system comprising a control relay for controlling the excitation of the generator field winding, switch means for connecting the generator to a load bus, voltage responsive relay means connected to complete an energizing circuit for said control relay when the generator voltage falls below a predetermined value to actuate the control relay to effect deenergization of the generator field winding, the control relay also being connected to effect operation of said switch means to open position upon actuation of the control relay, current responsive relay means connected to prevent completion of said energizing circuit when the generator current exceeds a predetermined value, time delay means controlled by said current responsive relay means for effecting actuation of the control relay independently of said energizing circuit, and lockout relay means controlled by the current responsive relay means for preventing operation of the switch means.

9. In an alternating current generator system including a main alternating current generator, an auxiliary alternating current generator, and switch means having a closed position for connecting said main generator to a load bus and a tripped position in which the main generator is disconnected from the bus and the auxiliary generator is connected to the bus, said main generator having a field winding and excitation means for supplying excitation to the field winding, a control relay for controlling the excitation of said field winding and operation of said switch means, voltage responsive means for effecting actuation of the control relay to effect deenergization of the generator field winding and operation of the switch means to tripped position when the generator voltage falls below a predetermined value, current responsive means for preventing actuation of the control relay by the voltage responsive means when the generator current exceeds a predetermined value, and means controlled by the current responsive means for effecting actuation of the control relay after a predetermined time delay and for preventing operation of the switch means.

10. In an alternating current generator system including a main alternating current generator, an auxiliary alternating current generator, and switch means having a closed position for connecting said main generator to a load bus and a tripped position in which the main generator is disconnected from the bus and the auxiliary generator is connected to the bus, said main generator having a field winding and excitation means for supplying excitation to the field winding, a control relay for controlling the excitation of said field winding and operation of said switch means, voltage responsive means for effecting actuation of the control relay to effect deenergization of the generator field winding and operation of the switch means to tripped position when the generator voltage falls below a predetermined value, current responsive means for preventing actuation of the control relay by the voltage responsive means when the generator current exceeds a predetermined value, time delay means controlled by the current responsive means for effecting actuation of the control relay independently of the voltage responsive means, and lockout means actuated by the current responsive means for preventing operation of the switch means.

11. A control and protective system for an alternating current generator connected to a load bus by a feeder conductor, the generator having a field winding and excitation means for supplying excitation to the field winding, said system comprising a control relay for controlling the excitation of the generator field winding, voltage responsive means for actuating said control relay to effect deenergization of the generator field winding when the generator voltage falls below a predetermined value, current responsive means for preventing actuation of the control relay by the voltage responsive means when the current in the feeder conductor exceeds a predetermined value, and means controlled by said current responsive means for effecting actuation of the control relay if the feeder current remains above said value for a predetermined time.

12. A control and protective system for an alternating current generator connected to a load bus by a feeder conductor, the generator having a field winding and excitation means for supplying excitation to the field winding, said system comprising a control relay for controlling the excitation of the generator field winding, voltage responsive means for actuating said control relay to effect deenergization of the generator field winding when the generator voltage falls below a predetermined value, current responsive means for preventing actuation of the control relay by the voltage responsive means when the current in the feeder conductor exceeds a predetermined value, and time delay means controlled by said current responsive means for effecting actuation of the control relay independently of the voltage responsive means.

No references cited.